United States Patent [19]

Markham

[11] Patent Number: 5,580,446

[45] Date of Patent: Dec. 3, 1996

[54] SCREEN, VORTEX APPARATUS FOR CLEANING RECYCLED PULP AND RELATED PROCESS

[75] Inventor: Larry D. Markham, Mobile, Ala.

[73] Assignee: International Paper Company, Purchase, N.Y.

[21] Appl. No.: 332,324

[22] Filed: Oct. 20, 1994

[51] Int. Cl.⁶ .............................. B03D 1/24; B03D 1/16; B01D 36/00
[52] U.S. Cl. ...................... 210/202; 210/221.2; 210/295; 210/298; 210/415; 210/512.3; 209/17; 209/169; 209/170; 209/273; 209/306; 162/4; 162/55
[58] Field of Search .................................... 209/169, 170, 209/17, 250, 273, 306; 210/202, 295, 221.2, 512.3, 298, 413, 414, 415; 162/55, 4

[56] References Cited

U.S. PATENT DOCUMENTS

| | | |
|---|---|---|
| 1,833,804 | 11/1931 | Watanabe . |
| 1,833,805 | 11/1931 | Watanabe . |
| 3,221,886 | 12/1965 | Lamort . |
| 3,256,995 | 6/1966 | Schmid . |
| 3,557,956 | 1/1971 | Braun . |
| 3,561,603 | 2/1971 | Salomon . |
| 3,635,788 | 1/1972 | Braun . |
| 3,677,402 | 7/1972 | Holz . |
| 3,873,410 | 3/1975 | Chupka . |
| 3,912,579 | 10/1975 | Braun . |
| 3,912,622 | 10/1975 | Bolton . |
| 4,013,505 | 3/1977 | Balcar . |
| 4,076,578 | 2/1978 | Puddington . |
| 4,147,616 | 4/1979 | Balcar . |
| 4,157,952 | 6/1979 | Krofta . |
| 4,166,028 | 8/1979 | Weber . |
| 4,186,094 | 1/1980 | Hellberg . |
| 4,202,761 | 5/1980 | Holz . |
| 4,214,982 | 7/1980 | Pfalzer . |
| 4,215,447 | 8/1980 | Gartland . |
| 4,289,628 | 9/1981 | Disselbeck . |
| 4,328,096 | 5/1982 | Chupka . |
| 4,397,741 | 8/1983 | Miller . |
| 4,399,028 | 8/1983 | Kile . |
| 4,512,888 | 4/1985 | Flynn . |
| 4,518,459 | 5/1985 | Freis . |
| 4,548,674 | 10/1985 | Hageman . |
| 4,620,671 | 11/1986 | Skaar . |
| 4,634,521 | 1/1987 | Simola . |
| 4,663,030 | 5/1987 | Chupka . |
| 4,710,287 | 12/1987 | Henrich . |
| 4,726,880 | 2/1988 | Smith . |
| 4,795,560 | 1/1989 | Chupka . |

(List continued on next page.)

FOREIGN PATENT DOCUMENTS

| | | |
|---|---|---|
| 2120436 | 10/1994 | Canada . |
| 1461090 | 6/1964 | Germany . |
| 61-11353 | 2/1986 | Japan . |
| 62-268892 | 11/1987 | Japan . |
| 746008 | 7/1980 | U.S.S.R. . |

*Primary Examiner*—Thomas M. Lithgow
*Attorney, Agent, or Firm*—Ostrager, Chong & Flaherty

[57] ABSTRACT

An apparatus for cleaning recycled pulp includes an upright cylindrical vessel having an upright cylindrical screen member open at its top and bottom ends and having a perforated screen wall which is centered on a vertical axis in the vessel. A plurality of upright, elongated blades are mounted for rotation on the vertical axis in close proximity to the screen wall. A pulp slurry entrained with pressurized air is introduced under pressure into an inlet in the bottom of the vessel. The rotating blades clear the screen wall while creating a rising vortex of air bubbles produced by the pressurized air for carrying ink and/or contaminant particles upwardly through the inner volume of the screen member. An "accepts" outlet at the center of the vessel draws off pulp in suspension that has been passed through the screen wall. A "rejects" outlet at the top of the vessel draws off ink and contaminant particles carried by the air bubbles in the upwardly-moving vortex. In related processes, the pulp slurry is processed in successive screen stages to refine the rejects stream to a high concentration while passing an accepts stream of high brightness and cleanliness.

10 Claims, 2 Drawing Sheets

U.S. PATENT DOCUMENTS

| | | |
|---|---|---|
| 4,851,111 | 7/1989 | Martin . |
| 4,997,549 | 3/1991 | Atwood . |
| 5,023,986 | 6/1991 | Gero . |
| 5,069,751 | 12/1991 | Chamblee . |
| 5,073,234 | 12/1991 | Mollett . |
| 5,078,859 | 1/1992 | Satomi . |
| 5,102,500 | 4/1992 | Darlington . |
| 5,126,039 | 6/1992 | Silander . |
| 5,131,980 | 7/1992 | Chamblee . |
| 5,141,598 | 8/1992 | Richman . |
| 5,173,177 | 12/1992 | Greenwood . |
| 5,186,332 | 2/1993 | Hatton . |
| 5,323,913 | 6/1994 | Papetti . |
| 5,381,906 | 1/1995 | Satomi . |

SCREEN, VORTEX APPARATUS FOR CLEANING RECYCLED PULP AND RELATED PROCESS

FIELD OF INVENTION

This invention generally relates to an improved method to deink or clean recycled pulp from waste paper. More particularly, it concerns a screen/vortex apparatus and related processes for effectively removing fine ink particles and other contaminants from the recycled pulp.

BACKGROUND ART

Waste paper that has been printed with ink or other printing material or other types of contaminated (non-printed) wastepaper can be recycled by repulping the paper and removing the ink and contaminants therefrom in order to produce acceptable pulp fiber for renewed papermaking. Conventional wastepaper processing systems have employed a finely slotted screen for separating contaminants from the repulped fiber in suspension. However, conventional screens (even with very fine slots of the order of 0.006") cannot effectively remove ink particles which due to their small size and flexibility tend to slip through even the fine slotting. Present technology has also employed agglomeration techniques for producing some ink agglomerates of a size that can be removed through screening. However, it is found that other fine ink agglomerates are still not removed in sufficient quantities using the conventional screening methods.

Various other proposals have been made for ink removal from recycled pulp. U.S. Pat. No. 4,215,447 to Gartland discloses one technique for washing high consistency fiber (up to 7%) stock by sweeping the ink in a divergent flow from the fiber. The washing apparatus includes a cylinder with a mesh screen and impeller bars rotated about a vertical axis within the screen. A "grey stock" containing ink particles and repulped fiber in suspension is fed into the bottom of the cylinder, while washing water is added through the top into an apertured inner chamber at the center of the cylinder. As the rising "grey stock" makes contact with the radially moving washing water under the stirring action of the rotating blades, the ink particles are swept radially outward through the mesh, while the fiber flows in suspension to an outlet at the top of the apparatus.

Another type of approach is shown in U.S. Pat. No. 4,397,741 to Miller for separating particles by flotation from a forced vortex. An upright cylindrical vessel has a tangential inlet at its upper end for feeding in the pulp slurry and an outlet at the lower end for the output cleaned fiber. The slurry is fed in a flow that creates a forced vortex in the vessel. A portion of the vessel wall is porous, and air is injected into the fluid layer moving along the vessel wall. The air bubbles become carriers for particle aggregates which float to the top of the vessel, so that cleaned pulp can be discharged at the bottom of the apparatus. U.S. Pat. No. 4,997,549 to Atwood shows another flotation apparatus that includes a froth washing tube within the vessel for introducing wash water under pressure.

U.S. Pat. No. 4,157,952 to Krofta shows another apparatus used in a flotation deinking process that has water injector nozzles and air inlets positioned to aerate the slurry and feed the slurry tangentially in a swirling rotation within the flotation tank. As the fluid spirals towards the center of the tank, the froth or foam bubbles carrying the ink particles float to the surface and are removed by a vacuum outlet.

Other patents showing flotation-type cleaners include U.S. Pat. Nos. 3,557,956, 3,635,788, and 3,912,579 to Braun; U.S. Pat. Nos. 4,013,505 and 4,147,616 to Balcar; U.S. Pat. No. 4,726,880 to Smith; U.S. Pat. Nos. 5,069,751 and 5,131,980 to Chamblee and U.S. Pat. No. 5,173,177 to Greenwood.

However, the prior types of flotation cleaners require large, expensive systems and equipment, and high concentrations of expensive agglomeration and flotation chemicals in order to obtain satisfactorily levels of ink removal. It would be desirable to have a pulp cleaning system requiring less costly or complex equipment and which can achieve high levels of ink and contaminant removal, particularly fine ink particles, without using high dosages of chemicals.

Accordingly, it is a broad object of the invention to provide a pulp cleaning apparatus and related processes for the effective removal of ink particles and contaminants from paper pulp.

Another object of the invention is to provide a low cost apparatus that effectively and efficiently removes ink particles and contaminants without using large amounts of expensive agglomeration or flotation chemicals.

A more specific object of the invention is to improve the overall yield of the deinking process, as well as improve the removal of fine ink particles. It is particularly desired to increase the recovered pulp's cleanliness and brightness by removing high levels of the fine ink particles which reduce brightness, and thereby achieve a reduction in the requirement for expensive bleaching chemicals.

SUMMARY OF THE INVENTION

In the present invention, these purposes, as well as others which will become apparent below, are obtained by a new pulp cleaning apparatus comprising an upright cylindrical vessel having an upright cylindrical screen member mounted therein which is open at its top and bottom ends and has a cylindrical screen wall with perforations of a fine size formed through its surface. The cylindrical screen member has a given diameter defining an inner volume and is centered on a vertical axis in the vessel. A plurality of upright, elongated blades are mounted for rotation about the vertical axis in close proximity to and on a radially inward side of the screen wall of the cylindrical screen member. An inlet is provided at a bottom portion of the vessel for feeding in a pulp slurry under pressure. Pressurized air is added with the feed pulp into the inner volume of the screen member. A rotor drive rotates the blades to keep the screen wall clear from being sealed over with pulp and contaminants, while creating a rising vortex of air bubbles from the added air for carrying ink particles and other contaminants upwardly through the inner volume of the screen member. An "accepts" outlet is provided at a central portion of the vessel for drawing off pulp that has been passed through the screen wall of the screen member. A "rejects" outlet is provided at a top portion of the vessel for drawing off the ink particles and other contaminants carried by the air bubbles in the upwardly-moving vortex through the top end of the screen member.

The invention also includes related pulp cleaning processes employing the aforementioned apparatus. The apparatus and processes of the present invention result in removal of large amounts of ink and contaminants even when the particles are of a fine size, are effective for a wide range of pulp types, and require hardly any chemicals.

Other objects, features and advantages of the present invention are described in greater detail in the following

DETAILED DESCRIPTION OF PREFERRED EMBODIMENTS

Figure 1:
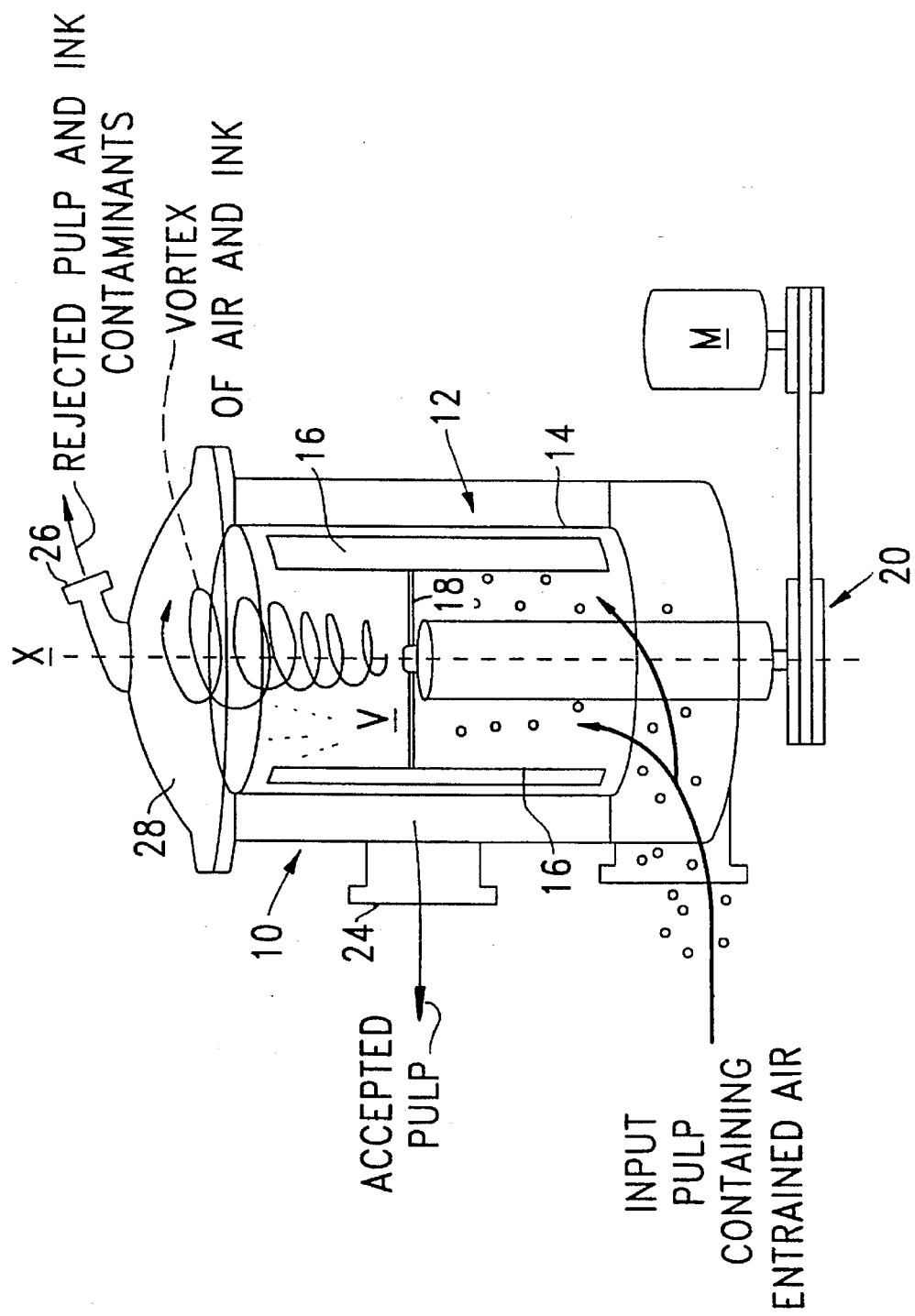
FIG. 1 is an schematic drawing of a screen/vortex pulp cleaning apparatus in accordance with the present invention.

Referring to FIG. 1, a pulp cleaning apparatus in accordance with the present invention comprises an upright cylindrical vessel 10 having an upright cylindrical screen member 12 mounted therein which is open at its top and bottom ends and has a cylindrical screen wall 14 with round or slotted perforations of a fine size formed through its surface. The cylindrical screen member 12 has a given diameter defining an inner volume V and is centered on a vertical axis X in the center of the vessel 10. A plurality of upright, elongated blades 16 are mounted to a rotor 18 which is driven by a drive axle through a sheave 20 that is coupled by a drive belt or gear to an external motor M. The blades are rotated about the vertical axis X in close proximity to and on a radially inward side of the screen wall 14. The vessel is sealed so that it can be pressurized.

An inlet 22 is provided at a bottom portion of the vessel 10 for feeding in a pulp slurry under pressure containing ink particles and/or other contaminants. The pulp slurry is entrained with pressurized air in the inner volume V of the screen member 12. The air may be injected with the pulp slurry at the inlet or introduced into the pulp slurry at a point upstream from the inlet or injected directly into the inner volume V of the screen member 12. Alternatively, the air can be added into the pulp slurry in a premixer to mix the air with the pulp slurry before it is injected into the screen area. The mixer can be a "motionless" type mixer or a mixer driven by a motor. A further method of adding the air would be to premix the air with dilution water, then adding the water/air mixture to the feed pulp going to the screen. In FIG. 1, the added air is indicated schematically by air bubbles added to the feed pulp.

As the pulp slurry and air mixture is injected into the inner volume V of the screen member 12, the rotor 18 is driven to rotate the blades 16. The rotating blades keep the perforations in the screen wall 14 from being sealed over with pulp and contaminants. At the same time, they create a vortex of air bubbles from the added air for carrying the ink particles and other contaminants upwardly through the inner volume of the screen member. The vortex of air bubbles, ink particles, and contaminants spirals upwardly through the open end of the screen member 12. An "accepts" outlet 24 is provided at a central portion of the vessel for releasing pulp that has been passed through the perforations of the screen wall 14. A "rejects" outlet 26 is provided at the top portion of the vessel for drawing off a stream of ink particles and/or contaminants carried by the air bubbles in the upwardly-moving vortex through the top end of the screen member.

As an example of generally preferred process conditions, the inlet feed for recycled pulp containing ink particles and other contaminants in suspension is pumped into the inlet 22 at the bottom of the vessel at an inlet pressure of from 5–75 psig, preferably 5–50 psig. The air pressure only needs to be slightly greater than the pressure of the pulp slurry at the air injection point. For example, the pulp slurry pressure at the inlet may be 25 psig, and the air injected at that point may be about 30 psig. It is found that beneficial results can be obtained when the air volume injected is from 2% to 20% of the volume of the pulp slurry. Amounts of air higher than 20% do not appear to substantially increase contaminant removal efficiency.

The pressures, rotor speed, and other process conditions are controlled such that the pulp becomes impelled and filtered through the cylindrical screen. The clean accepts are released through the side outlet 24 at a pressure lower than the feed pressure. The pulp slurry contains paper pulp fibers in water suspension having a consistency in the range of 0.5–4.0%, and preferably 0.7–2.0%. Low pulp consistency is preferred because the low viscosity of the pulp suspension allows the air bubbles and contaminants to move freely into the low pressure area in the center of the screen and rise to the top of the screen. The apparatus can be operated over a wide range of temperatures, but temperatures of 100°–130° F. are normally preferred. The rejects stream of air bubbles, ink, contaminants, and some pulp is drawn off through the rejects outlet 26 at the top of the vessel at a pressure close to the inlet pressure.

The pressure screen member 12 and the rotating blades are designed so as to create a low pressure zone in the inner volume V of the screen where the rising vortex forms carrying the air bubbles and ink and contaminant particles. The screen wall may be smooth or, preferably, has a contoured surface (roughened with a corrugated or wavy surface) in order to create additional turbulence to divert ink and contaminant particles from the screen wall area. The screen can have fine slots of the order of 0.002–0.020", preferably 0.004–0.014", in width. Alternatively, the screen can have holes with a diameter in the range of 0.025–0.100", preferably 0.040–0.070".

The preferred rotor design is an open-type rotor with individual hydrofoil blades, rather than a conventional drum type rotor. The drum-style rotor would occupy a significant volume in the center of the screen member and interfere with the free movement of air through the central area of the screen, thereby increasing the likelihood that contaminants will pass through the screen. The rotor preferably has three or four or more equally spaced blades. In tests conducted of the present invention, a commercially available pressure screen unit was obtained from Black Clawson Company, of Middletown, Ohio, designated the Ultra V-300. This unit was powered by a 100 hp motor and operated at a rotor speed of 730 rpm, which translates to a peripheral speed of about 4600 ft/min. The flow rate of accepted pulp was about 51 tons/day.

The ink and contaminant particles have a strong affinity for air bubbles and therefore become collected in the vortex and are removed with the air bubbles in the rejects stream from the screen. The particles may be agglomerated with agglomeration chemicals prior to feeding in. It is found that even particles which are small enough to be passed through the screen perforations become entrained in and removed with the rejects stream by the operation of the apparatus of the invention. The swiftly rising vortex of air bubbles and the turbulence created by the rotating blades keep the particles moving away from the screen basket so that they are not passed to the accepts stream. Contaminant particles such as plastic, hot melts, adhesives, ink and even colloidal particles of dispersed wax are usually hydrophobic and will therefore tend to attach to the air bubbles. Therefore, the addition of the usual types of flotation deinking chemicals, combination flotation-washing deinking chemicals, and agglomeration chemicals are not needed for the operation of this apparatus.

The preferred location for the top rejects outlet is in the center of a top cover 28 for the vessel. The advantage of a center rejects outlet is that it helps to stabilize the vortex which forms along the center axis of the screen member and the rotor. A stable vortex helps to hold the ink and contaminant particles in the center of the screen, away from the screen cylinder, and therefore improves the removal efficiency for the ink and contaminants. The shape of the top cover 28 can be dished, or it can have other shapes such as flat or conical. A dished or conical cover is preferred because these shapes will help to stabilize the vortex.

Dilution water can be added into the area at the top of the screen. The benefit of adding dilution water at this point is that it reduces the consistency of the rejects stream and washes some of the pulp fiber out of the vortex and back into the screening zone where it can be passed to the accepts stream. The dilution water should be added tangentially and in the same direction as the blades are rotating to help improve the formation of the vortex in the top of the screen.

EXAMPLE I

Laser-printed office waste paper was treated in a 14' diameter hydrapulper with an agglomeration deinking chemical for 40 minutes at 160° F. and pH 10, and was then processed through a liquid cyclone for removal of metal staples and heavy contaminants, and passed through a first screen with 0.050" holes for removal of debris in a conventional manner. The cleaning efficiency of the conventional screen varies depending on the size of the contaminants but it passes through the fine sized ink and contaminant particles.

As a test of the present invention, the accepts stream from the first screen unit was then processed by entrainment with air through a second screen unit of a vortex or upflow design (as described above) equipped with a fine screen basket of 0.006" slots. This vortex screen unit was equipped with an air addition point ahead of the screen inlet. The consistency of the feed pulp slurry to the second screen unit was 1.2%.

Samples were taken of the inlet feed and the accepts pulp from the second screen unit for measurement of contaminant content according to the TAPPI dirt count method (TAPPI Method T-213). When the air injection to the inlet feed was turned on, it was found that the amperage on the drive motor for the blades decreased as the air flow increased. This was attributed to the lower drag on the blades due to the air volume entrained with the pulp slurry. The air flow was increased until the motor amps decreased from 67 amps to 40 amps. Samples were taken of the inlet feed and the screen accepts. The contaminant counts were as follows (two samples taken for verification in most cases):

Screen feed w/o air addition: 785 ppm, 791 ppm

Screen feed with air addition: 840 ppm, 878 ppm

Screen accepts w/o air addition: 723 ppm, 814 ppm

Screen accepts with air addition: 431 ppm, 488 ppm

These results show that the upflow screen efficiency was 2% without air addition, and 46% with the air addition. The high level of contaminant removal was attributed to the air bubbles and vortex created by the air injected in the fluid medium. The power saving on the drive motor was an unexpected added benefit.

EXAMPLE II

The procedures of the previous example were repeated, using a different batch of office waste paper in the hydrapulper. The pulp feed to the slotted screen had a consistency of 1.3%–1.4%. The contaminant counts were as follows:

Screen feed w/o air addition: 705 ppm, 860 ppm

Screen feed with air addition: 719 ppm

Screen accepts w/o air addition: 761 ppm, 731 ppm

Screen accepts with air addition: 559 ppm

With these results, the upflow screen efficiency showed 5% without air addition, and 22% with the air addition.

Figure 2:
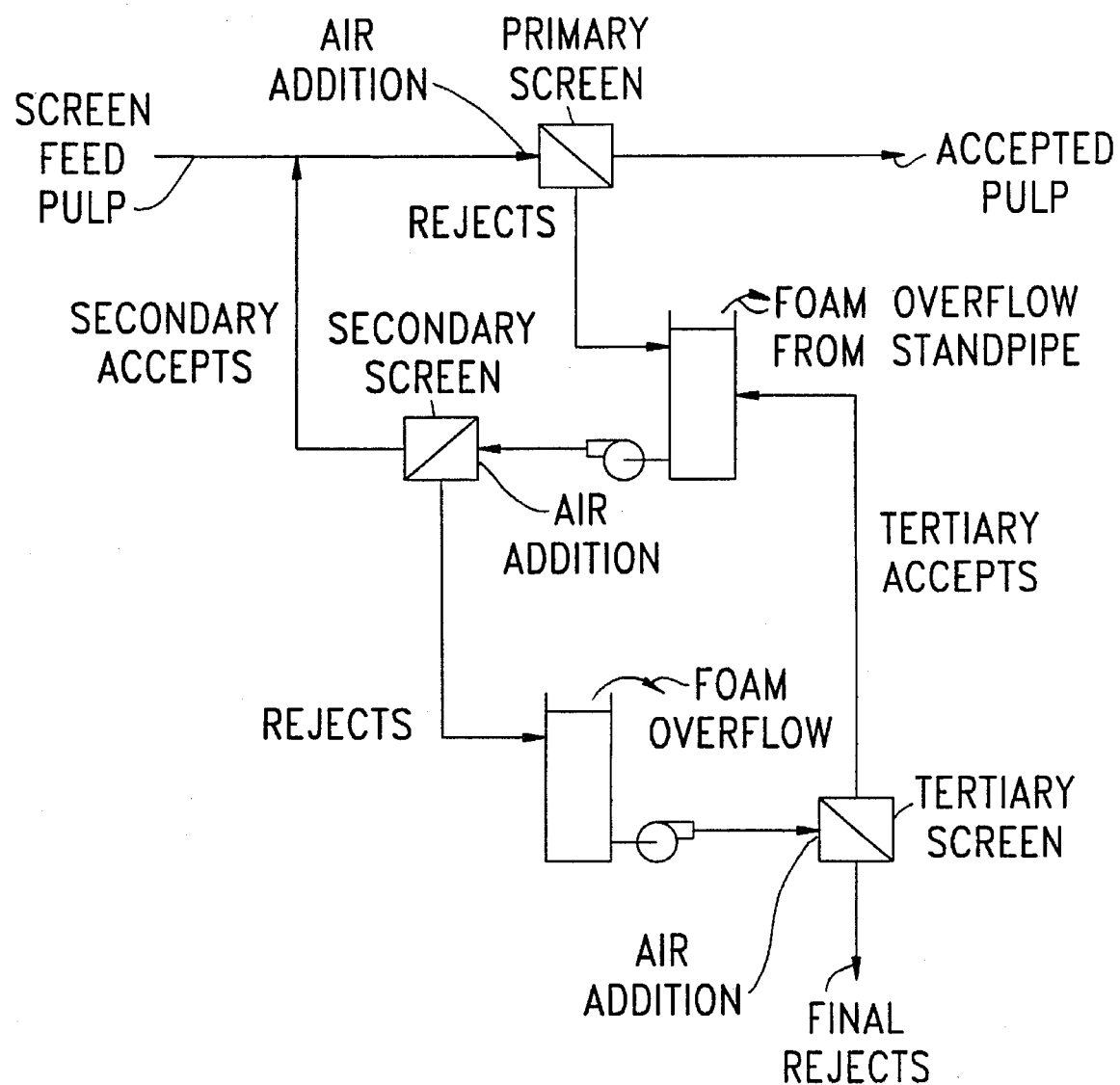
FIG. 2 is a diagram of a preferred pulp cleaning process of the present invention.

Referring to FIG. 2, a pulp cleaning process employs the screen/vortex apparatus in one or more stages to obtain an accepts pulp output of high cleanliness and brightness, while at the same time producing a final rejects stream containing a high concentration of ink and contaminants. In a first or primary screen stage, the reject rate is set high enough so that very little ink and contaminant material can be passed to the accepts stream. The trade-off is that the primary rejects stream will contain a large amount of recoverable pulp. Therefore, the primary rejects stream, containing fine ink as well as large ink particles, is sent to a tank or standpipe. Foam created by the entrained air in the rejects stream overflows from the top of the standpipe and carries with it a high concentration of ink and contaminants.

The remainder of the primary rejects stream is then sent to a secondary screen stage for another round of separation processing. Air entrained in the primary screen rejects can supply part or all of the necessary air for the secondary screen. The accepts stream from the secondary screen will in some cases be clean enough that it can be sent forward in the system with the primary screen accepts, or it can be rescreened by combining with the input feed to the primary screen. If the secondary screen accepts can be passed with the primary screen accepts, then the capacity of the system can be increased as a higher tonnage of pulp can be processed with equipment of a given size and horsepower.

The rejects stream from the secondary screen stage can be sent to a second tank for removal of a foam overflow of concentrated ink. The remainder of the secondary rejects stream can be sent to a tertiary screen stage for further separation processing which yields a highly concentrated rejects stream as a final output of waste ink and contaminant material. In other embodiments, some of the pressure screens in the system can be conventional screens. For example, the primary screen can have the new vortex-upflow design, while the secondary and tertiary screens can be conventional. The system may also be used without the foam overflow tanks. For example, conventional reject tanks without foam overflow may be used.

Additional air may be added at the inlet to or prior to the screen stage or added in a pre-mixer to improve the collection of ink particles. Air can also be added to the screen rejects tank to improve the removal of ink from the tank with the overflow foam. Chemicals can be added to increase the amount of foam, or to increase the attraction of the ink particles and contaminants for the air bubbles.

The present invention is advantageous over traditional pressure screens in that the forces of the quickly rising vortex and rotating blades keep the fine ink particles and contaminants from being carried into the accepts stream through the screen. As a result, the accepts output has a higher cleanliness and brightness than is obtained with prior processes. The disclosed screen/vortex system is able to remove larger amounts of ink and contaminants than conventional systems and operates effectively even when the particle size is small.

The apparatus and processes of the invention can also be used for so-called "brown recycle" systems for repulped paper, such as old corrugated containers and mixed paper, which does not require ink removal but does require contaminant removal. The new screen/vortex system can remove very fine particles of hydrophobic contaminants, such as wax, stickies, hot melt glues, and plastic, which are normally present in brown fiber. All of these contaminants are attracted to and carried off by the vortex of air bubbles without the need for chemicals (not usually used in brown recycle systems). Use of the screen/vortex system can improve the cleanliness of brown pulp and reduce the amount of additional cleaning and screening stages required to achieve a given level of cleanliness.

The simplicity of the screen/vortex equipment makes it less costly and complex than conventional deinking processes using washing and flotation equipment. The equipment can be fabricated as a relatively compact unit with a very high throughput of pulp accepts. Proper operation of the equipment avoids screen clogging and excessive downtime. Successive screen stages can be used to obtain a high level of cleaned pulp recovery and a high level of ink removal without sacrificing throughput. The pulp feed can use deinking agent with no pH adjustment to the waste paper, or deinking agent in an alkali pH range, or deinking agent in the presence of other chemicals such as bleaching agents, defoamers, sizing agents, brighteners, water quality processing agents among others. The inlet feed can be used without or with only a low amount of agglomeration chemicals. Flotation chemicals need not be used at all for the screen/vortex stages. The present invention can be adapted to handling a wide variety of pulp types, including wood-containing pulp or wood-free pulp, and, if desired, can accomodate treatment with agglomeration and flotation chemicals.

Numerous modifications will be apparent in light of the above disclosure. Although the invention has been described with reference to certain preferred embodiments, it will be appreciated that other modifications of the preferred apparatus and processes may be devised. It is intended that all such modifications be included within the scope and spirit of the invention as defined in the following claims.

I claim:

1. An apparatus for removing ink and other contaminants from a pulp slurry of recycled paper pulp in liquid suspension, comprising:

an upright cylindrical vessel having an upright cylindrical screen member mounted therein, said screen member being open at its top and bottom ends and comprising a cylindrical screen wall with perforations of a fine size formed through its surface, said cylindrical screen member having a given diameter defining an inner volume on a radially inward side of the screen wall and being centered on a vertical axis in the vessel;

an open-typed rotor which does not significantly block the open bottom end of said screen member and which includes a plurality of individual blades mounted for rotation about the vertical axis in close proximity to and on a radially inward side of the screen wall of said screen member;

an inlet provided at a bottom portion of the vessel for feeding in a pulp slurry under pressure into the bottom end and the inner volume of said screen member in said vessel, and air addition means for adding pressurized air as air bubbles into the pulp slurry fed into the vessel;

drive means for rotating said blades to impel the pulp slurry fed into the inner volume through the screen wall and also keep the perforations in the screen wall clear while creating a rising vortex of liquid and air bubbles from the added air carrying ink and other contaminants adhered thereto moving from the bottom end of the screen member upwardly through the inner volume to the top end of the screen member;

an accepts outlet provided at a central portion of the vessel for drawing off pulp in suspension that has been passed through the screen wall of said screen member; and a rejects outlet provided at a top portion of the vessel for drawing off a rejects stream from the vortex of liquid and air bubbles carrying ink and other contaminants moving upwardly through the inner volume to the top end of said screen member.

2. An apparatus according to claim 1, wherein said screen wall has slots having a width in the range of 0.002–0.020".

3. An apparatus according to claim 1, wherein said screen wall has holes having a diameter in the range of 0.025–0.100".

4. An apparatus according to claim 1, wherein said blades are individual blades having a hydrofoil shape which are mounted to a rotor with equal circumferential spacings between them.

5. An apparatus according to claim 1, wherein said air addition means adds the pressurized air at a volume of from 2% to 20% of the volume of the pulp slurry.

6. An apparatus according to claim 1, wherein said inlet feeds in the pulp slurry under pressure in the range of 5–75 psig.

7. An apparatus according to claim 1, wherein said air addition means adds air injected at a pressure slightly higher than the pressure under which said inlet feeds in the pulp slurry.

8. An apparatus according to claim 1, wherein said inlet feeds in the pulp slurry having a consistency in the range from 0.5% to 4.0%.

9. An apparatus according to claim 1, wherein said inlet feeds in the pulp slurry having a consistency of 0.7% to 2.0% under pressure in the range of 5–50 psig, and said air addition means adds air injected at a pressure about 5 psig higher than the pressure of the pulp slurry.

10. An apparatus according to claim 1, wherein said screen wall has a contoured surface for creating fluid turbulence in the area of the screen wall.

* * * * *